No. 806,963. PATENTED DEC. 12, 1905.
A. E. EVANS & F. CARON.
TREE FELLING FOOTBOARD.
APPLICATION FILED JULY 19, 1905.
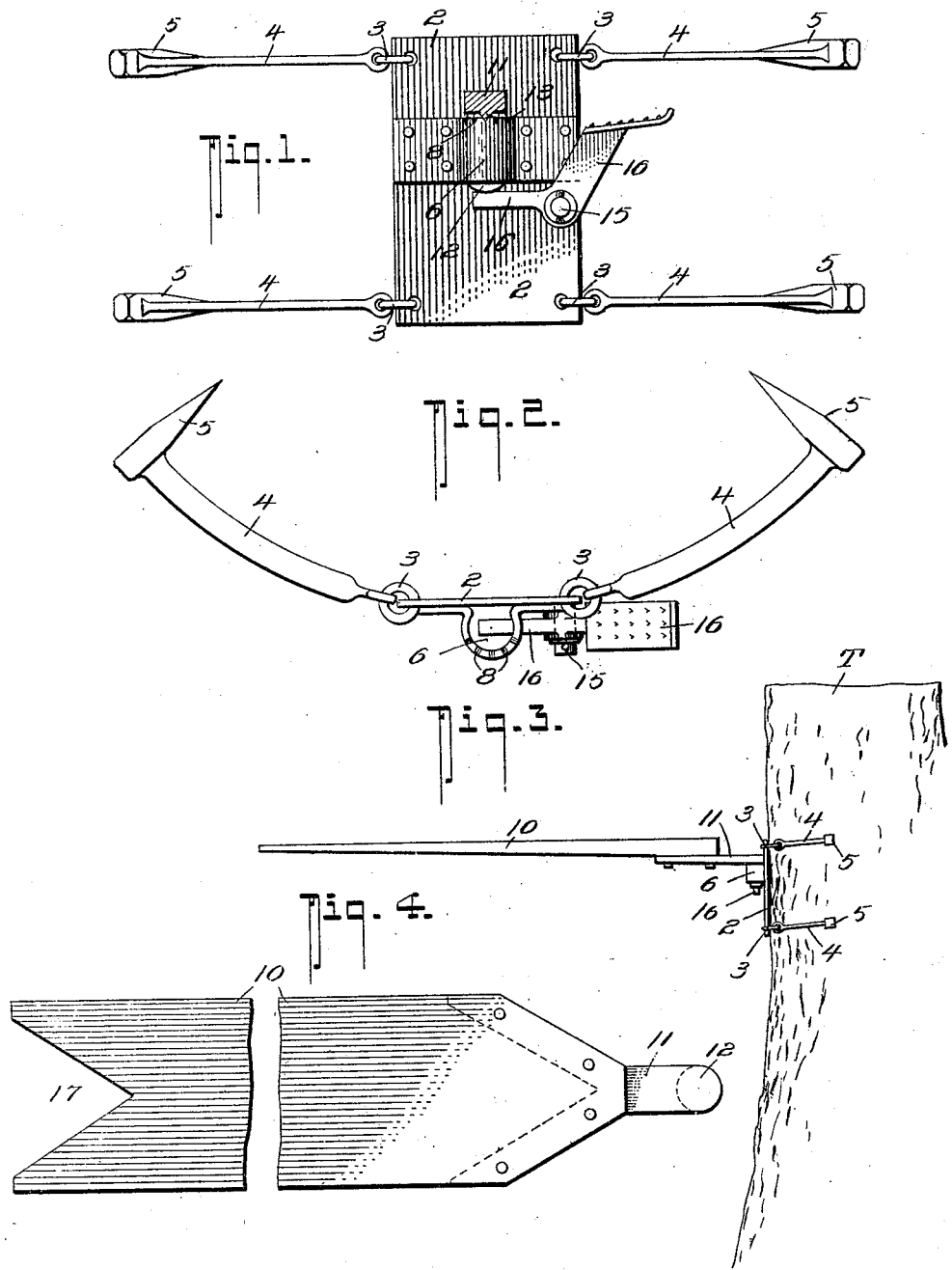

UNITED STATES PATENT OFFICE.

ARTHUR E. EVANS AND FORTUNA CARON, OF BEATON, CANADA.

TREE-FELLING FOOTBOARD.

No. 806,963. Specification of Letters Patent. Patented Dec. 12, 1905.

Application filed July 19, 1905. Serial No. 270,342.

*To all whom it may concern:*

Be it known that we, ARTHUR E. EVANS and FORTUNA CARON, citizens of the Dominion of Canada, residing in the town of Beaton, in the Province of British Columbia, Canada, have invented a new and useful Improvement in Tree-Felling Footboards, of which the following is a specification.

Our invention relates to an improved footboard, such as is used to afford a standing for axmen or sawyers while felling large trees or cutting such when felled, and is directed to an improved means for securing the same to the bole or trunk of the tree. The practice usually followed of securing such footboards by driving them into notches cut at the desired height in the wood of the tree is attended with many disadvantages. Not only is a considerable amount of time occupied in cutting the notches and securing the boards therein, but the method offers no facility for varying the position of the board laterally, as is frequently required, and the system is, moreover, attended with some danger, owing to the boards working loose. Means have heretofore been provided to overcome these difficulties; but the insufficiency of them is evidenced by the fact that the old method of securing the board in a notch still prevails.

Our invention is therefore directed to the provision of a light and simple device which can be quickly attached either to a tree when standing or after it is felled to afford a convenient and secure footing for either axmen or sawyers, and it comprises also a means for pivotally mounting the footboard to the tree attachment that it may be moved laterally and secured in any desired position. There is also a device for effecting the release of the position attachment and facilitating the rotation of the board on its pivot when it is desired to change its position.

The invention is fully described in the following specification and illustrated in the drawings which accompany it.

Figure 1 is a front elevation of the tree attachment; Fig. 2, a plan of the same with the footboard removed; Fig. 3, a side elevation showing the application of the device to a tree-trunk, and Fig. 4 is a plan of the footboard detached.

In the drawings, T represents the trunk of a tree to which the device is shown as applied; 2, a rectangular plate, preferably made of thin sheet-steel, as giving the necessary strength with the desirable lightness for purposes of portability. Connected to each corner of this plate 2 by links 3 are anchor-spikes 4 of thin flat steel, which members are curved to conform approximately to the round of the tree, the spikes 5 being approximately at right angles to the curvature at the end and extended backward to give a head for convenience in driving Secured across the width of the plate 2, toward the upper end thereof, is a strip of thin flat steel bent outward at the center, so as to form when riveted to the plate a socket 6 for the reception of the pivotal connection of the footboard.

The footboard 10 is secured to a member 11, having a downwardly-projecting pivot member 12 designed to enter the socket 6 of the plate 2, and the under side of the horizontal portion has a V-shaped downward projection 13, adjacent to the pivot 12, which projection 13 is designed to engage in one or other of a series of radial notches or depressions 8 in the upper edge of the socket-plate. The engagement of this projection 13 in any one of the radial notches 8 will secure the footboard 10 in any desired position against rotation.

Pivotally mounted on a stud 15, secured to and projecting from the face of the plate 2, is a treadle-lever 16, the end of which opposite to the treadle extends under the end of the pivot 12, which downwardly projects through the socket 6. The object of this device is to enable the feller to readily shift the position of his footboard, for by depressing the treadle the pivot of the footboard is lifted until the projection 13 is clear of the notches 8, when the board 10 may be rotated to any desired position and lowered into another notch. The lower end of the pin 12 is rounded to facilitate rotation on the end of the lever 16, and the extreme outer end of the footboard 10 is provided with a swallow-tailed V 17 to afford hold for an ax to effect the desired movement.

From the foregoing description it will be seen that a portable, readily-applied, and conveniently-operated device is provided affording a considerable range of movement of the footboard, which is safely held in the several positions and quickly moved laterally when desired. The plate gives a steady support for the pivot, while the four anchors enable it to be firmly attached to trees of varied sizes whether standing or felled. It is obvious that although designed for application to trees it may be made in smaller sizes for use by telegraph-linemen on posts where the work required may be too extended to be conveniently done with the help of climbing-spurs alone.

Having now particularly described our invention and the manner of its application and use, we hereby declare that what we claim as new, and desire to be protected in by Letters Patent, is—

1. In a device of the class described; the combination with a footboard having a downwardly-projecting pivot at one end, of a socket therefor secured to a rectangular frame to each corner of which an anchor-spike is connected by a link, means for retaining the pivot of the footboard in varied positions of angular rotation and means for releasing it from such retention.

2. In a device of the class described; the combination with a footboard having a downwardly-projecting pivot at one end and a swallow-tailed V at the other, of means by which the board may be attached to a tree or the like, such means comprising a rectangular plate-frame to each corner of which an anchoring-spike is connected by a link, and a socket designed to receive the downwardly-projecting pivot of the footboard secured toward the upper side of the plate.

3. In a device of the class described; the combination with a footboard having a downwardly-projecting pivot at one end, of a socket designed to receive the pivot, secured to a rectangular frame to each corner of which an anchor-spike is secured by a link, means for retaining the pivot against rotation in its socket, such means comprising a downwardly-projecting portion on the under side of the horizontal portion of the pivot member designed to enter any one of a series of grooves in the upper edge of the socket, and means for lifting the pivot to enable the downwardly-projecting portion to clear the groove.

4. In a device of the class described; a rectangular plate having connected to each corner by a link an anchoring-spike having a thin flat shank member backwardly curved to conform to the round of the trunk of a tree or the like, a socket secured toward the upper edge of the rectangular plate, the upper edge of which socket is provided with a series of radial notches, a pivotal member the pivot of which is designed to enter and pass a short distance through the socket and having a horizontal portion to which the footboard is secured, a downward projection on the under side of the horizontal portion adjacent to the pivot to engage the radial notches of the socket, and means for lifting the pivotal member in the socket so that the downward projection of its horizontal portion may be freed from engagement with the radial notches.

5. In a device of the class described; the combination with a footboard, of a pivotal member having a horizontally-extended upper portion to which the footboard is secured, a downwardly-projecting portion on the under side of the horizontal portion adjacent to the pivot, of a socket secured to a frame member to which frame anchoring-spikes are each connected by a link, means for lifting the pivot member from engagement with the notches of the socket, such means comprising a treadle member pivotally mounted on the frame to which the socket and anchor members are connected, and extended beneath the end of the pivot which downwardly projects below the socket.

In testimony whereof we have signed our names to this specification in the presence of two subscribing witnesses.

ARTHUR E. EVANS.
    FORTUNA CARON.

Witnesses:
 FRED. C. ELLIOTT,
 E. LEVESQUE.